United States Patent
Bui et al.

(10) Patent No.: US 10,008,226 B1
(45) Date of Patent: Jun. 26, 2018

(54) DYNAMIC HEAD OFFSET SELECTION FOR TAPE DRIVE

(71) Applicant: International Business Machines Corporation, Armonk, NY (US)

(72) Inventors: Nhan X. Bui, Tucson, AZ (US); Tsuyoshi Miyamura, Yokohama (JP); Eiji Ogura, Yokohama (JP); Tomoko Taketomi, Yamatao (JP); Kazuhiro Tsuruta, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/636,441

(22) Filed: Jun. 28, 2017

(51) Int. Cl.
| | |
|---|---|
| *G11B 5/584* | (2006.01) |
| *G11B 5/55* | (2006.01) |
| *G11B 5/008* | (2006.01) |
| *G11B 15/06* | (2006.01) |
| *G11B 5/48* | (2006.01) |
| *G11B 23/30* | (2006.01) |
| *B23K 26/382* | (2014.01) |
| *G11B 5/58* | (2006.01) |
| *G11B 5/78* | (2006.01) |

(52) U.S. Cl.
CPC .......... *G11B 5/5504* (2013.01); *B23K 26/382* (2015.10); *G11B 5/00817* (2013.01); *G11B 5/4893* (2013.01); *G11B 5/58* (2013.01); *G11B 5/584* (2013.01); *G11B 5/78* (2013.01); *G11B 15/06* (2013.01); *G11B 23/30* (2013.01)

(58) Field of Classification Search
CPC ... G11B 5/59627; G11B 5/4886; G11B 5/553; G11B 5/59683; G11B 5/588; G11B 5/584; G11B 20/10009; G11B 20/10305; G11B 2220/90
USPC ....... 360/48, 77.17, 77.05, 75, 77.01, 78.02, 360/78.14, 77.12; 369/44.32, 53.14, 369/53.15, 44.28, 44.27
See application file for complete search history.

(56) References Cited

U.S. PATENT DOCUMENTS

| | | | |
|---|---|---|---|
| 5,982,711 A | 11/1999 | Knowles et al. | |
| 6,169,640 B1 * | 1/2001 | Fasen | G11B 5/584 360/121 |
| 6,430,008 B1 | 8/2002 | Trabert et al. | |
| 7,436,621 B2 | 10/2008 | Goker et al. | |
| 8,446,686 B2 * | 5/2013 | Higashino | G11B 5/59633 360/55 |
| 8,780,486 B2 | 7/2014 | Bui et al. | |
| 2009/0316296 A1 | 12/2009 | Cherubini et al. | |
| 2014/0118856 A1 | 5/2014 | Underkofler | |
| 2015/0092296 A1 | 4/2015 | Oberg et al. | |

* cited by examiner

*Primary Examiner* — Nabil Hindi
(74) *Attorney, Agent, or Firm* — Scott S. Dobson (57) ABSTRACT

A method and system for adjusting a servo head in a tape drive is disclosed. Position information for the servo head can be obtained and used to determine if an adjustment of one of the servo heads is necessary. By comparing the position of the tape against two servo heads, erroneous adjustments to the servo head can be obviated.

20 Claims, 4 Drawing Sheets

DYNAMIC HEAD OFFSET SELECTION FOR TAPE DRIVE

BACKGROUND

The present disclosure is related to dynamic offset selection of tape drive servo heads and track following control. A tape drive is a storage device that reads and writes data on a magnetic tape. Magnetic tape storage can be used for archival data storage, is fairly economical, and has reliable archival stability. A tape drive provides sequential access storage, and physically winds tape between reels to read a particular piece of data. Track following control can be important for the reliability of data both read and recorded from a tape drive.

SUMMARY

The following presents a simplified summary of the disclosure in order to provide a basic understanding to the reader. This summary is not an extensive overview of the disclosure and it does not necessarily identify key features or essential features of the invention, nor does it delineate the scope of the invention. Its sole purpose is to present some concepts disclosed herein in a simplified form as a prelude to the more detailed description that is presented later.

The present disclosure provides a system and method for reading a tape drive.

In one embodiment, the tape drive is configured to obtain a number of y-positions for a plurality of servo heads. The tape drive can then be configured to determine a change in the y-positions for the first and second servo head. This determination can be made by determining that a y-position signal spike is detected at one of the servo heads. In response to determining that a y-position signal spike is detected at one of the servo heads, the offsets of the two servo heads are determined. The difference between the two offsets and the offset reference constant is then determined. If it is determined that the difference between the servo head offsets is not equal to the offset reference constant, a control adjustment is performed for the first and second servo head.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the embodiments described. On the contrary, the intention is to cover all modifications, equivalents, and alternatives falling within the spirit and scope of the invention.

DETAILED DESCRIPTION

Figure 1:
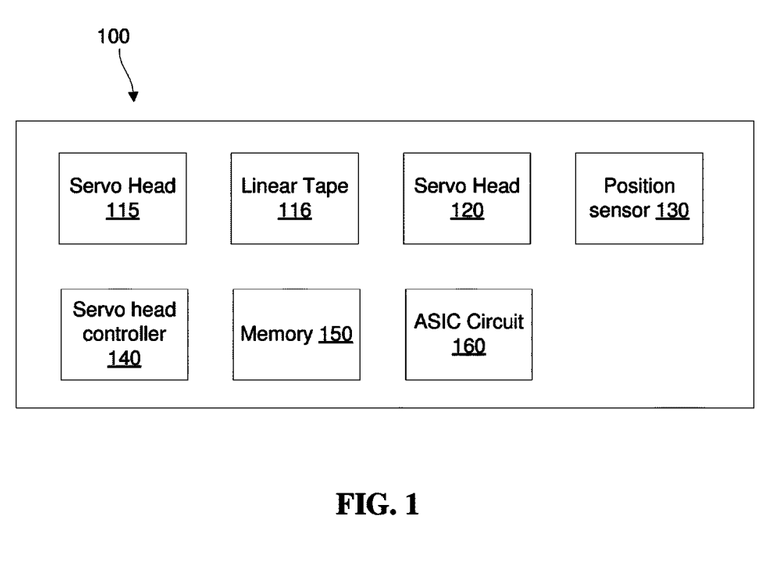
FIG. 1 is a block diagram illustration of a tape drive system.

FIG. 1 is a block diagram illustrating components of a tape drive 100, according to one illustrative embodiment. The tape drive 100 is a data storage device that reads and writes data on a magnetic tape through magnetoresistance, thin-film induction, or any other type of data encoding to a magnetic tape. The tape drive 100 includes a servo head 115, a linear tape 116, a servo head 120, position sensor 130, a servo head controller 140, a memory 150, and an application-specific integrated circuit (ASIC Circuit) 160. In some embodiments, the tape drive 100 is coupled to the computer system of FIG. 4.

Servo head 115 is a component of the tape drive 100 that reads data from and writes data to the linear tape 116. Servo head 120 is a component of the tape drive 100 that operates similar to servo head 115. For example, servo head 120 also operates to read data from and write data to the linear tape 116. Servo heads 115 and 120 will be discussed together and will in some embodiments both be represented by the term "servo heads". In one embodiment, the linear tape 116 is a magnetic tape medium with a two dimensional surface. An x dimension runs along the length of the tape, and a y dimension runs across the width of the tape. The linear tape 116 includes a first and a second y-position channel which is encoded along the edges of the track data on the linear tape 116. For example, a first y-position channel can be encoded above a data track on the linear tape 116. A second y-position channel can be encoded below a data track on the linear tape 116. These y-position channels can also be described as servo head channels. These y-position channels provide reference data that can be picked up by the servo heads as the servo heads access data tracks on the linear tape 116. Thus, as the data track is accessed by one or more of the servo heads, the data track is coupled to a y-position channel that is used by the tape drive to identify the position of the data track being accessed. As a particular servo head reads or writes a data track on a linear tape, it also accesses the two y-position servo head channels. In some embodiments, the first and second y-position channel can be a left and a right y-position servo head channel respectively. In other embodiments, the left channel can be the second channel and the right channel can be the first channel. This position information can be used by the tape drive 100 to determine the position of the servo head 115 and/or 120 in relation to data tracks on the linear tape 116. For example, this information can be used to instruct the tape drive 100 where to position a servo head to write data to, or read data from, a particular track of data on a linear tape 116.

Position sensor 130 is a component of the tape drive 100 that is configured to determine the position of one of more of the servo heads in relation to a position channel on the linear tape 116. The position sensor 130 is communicably or logically coupled to servo head 115 and servo head 120. It should be noted that each servo head can have a corresponding position sensor 130. In some embodiments, sensor 130 is part of servo heads 115 and/or 120. Position sensor 130 is configured to pick up a signal from the linear tape 116 that includes position information related to the position being read or written by the servo head. Position sensor 130 can include two or more servo channels. In some embodiments, the servo channels can be a first and a second channel. In another embodiment, the servo channels can include 3 or more channels. In some embodiments, the position sensor 130 allows for the y-position (YPOS) information of the servo head, relative to the linear tape 116, to be obtained through these respective channels. In some embodiments information received from the position sensor 130 can be used by the tape drive 100 as feedback control to maintain a correct position of the servo heads 115 and 120 over the data track on the linear tape 116.

Servo head controller 140 is a component of the tape drive 100 which determines, based on information received, where to position the servo heads 115 and 120. The tape drive control processes 200 and 300 are explained in further detail below and in FIG. 2 and FIG. 3. The current position of the servo heads can be retrieved from memory 150 by the position sensor 130. The tape drive 100 can deliver instructions to the servo head controller 140 to perform a control adjustment to apply an adjustment to the servo heads 115 and/or 120.

Memory 150 is a component of the tape drive 100 that stores data that can be retrieved by the tape drive 100 to determine that an adjustment is needed. Memory 150 can be dedicated or undedicated memory. Memory 150 can include computer system readable media in the form of volatile memory, such as main memory (e.g., primary RAM) or cache memory. Memory 150 can also include non-volatile memory, such as a hard drive, flash memory, solid state memory, etc. Information related to the YPOS data retrieved by the position sensor 130 and servo heads 115 and 120 can be stored in and retrieved from memory 150. Factory servo head position calibration data and other hardware information, which are established during the manufacturing process of the tape drive, can also be stored and retrieved through memory 150, and will be discussed in further detail below. The servo head position calibration data provides a reference point to determine the servo head positions relative to each other. It should be noted memory 150 is separate from the storage medium of the linear tape 116.

ASIC circuit 160 is a component of the tape drive 100 that provides the current value of the YPOS to the tape drive 100. In some embodiments, the ASIC circuit 160 is communicably and/or logically coupled to the position sensor 130. In some embodiments, ASIC circuit 160 is a component of the position sensor 130. In other embodiments, the ASIC circuit 160 receives the raw data signal from the position sensor 130, and calculates the YPOS. The ASIC circuit 160 then sends the YPOS data to the tape drive and/or stores the YPOS data in memory 150. To determine the YPOS, the ASIC circuit 160 can be configured to look for a signal or indication. This signal or indication can be random noise, an absence of noise, a predetermined data sequence, or any other signal that can be determined by the ASIC circuit 160 as representing a YPOS. This signal can be located in the region between two tracks on the linear tape 116. This signal allows the YPOS signal to be parsed from the normal track data by the ASIC circuit and also identify a spike in a signal which may indicate a change in the YPOS.

Figure 2:
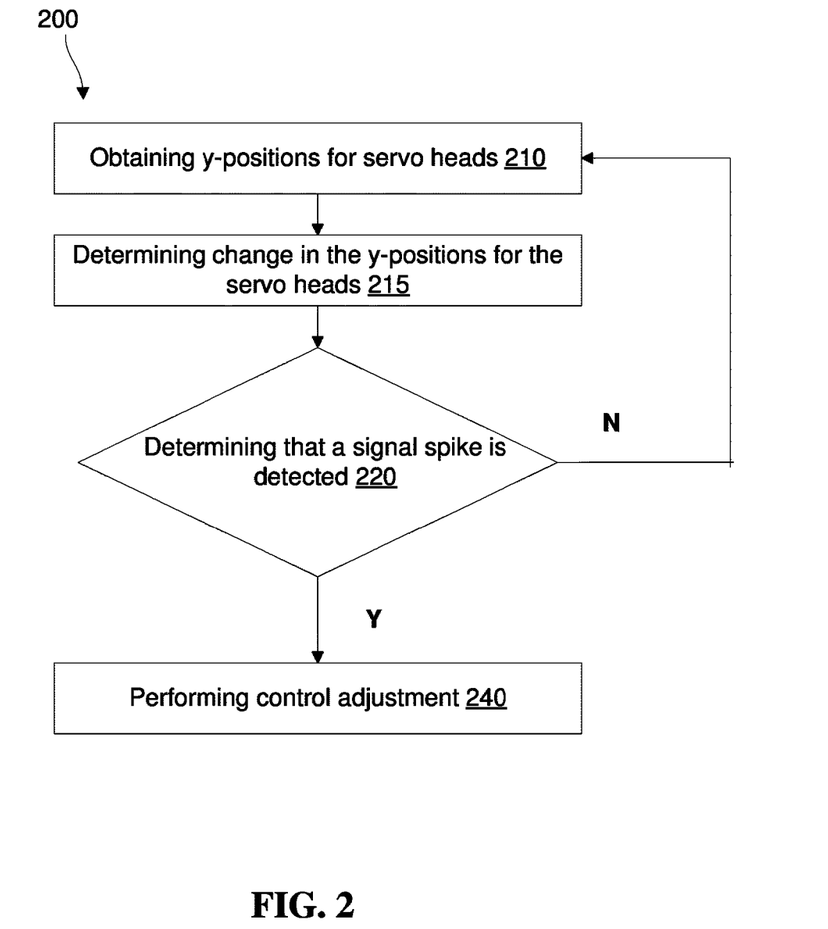
FIG. 2 is a block diagram illustration of a process for controlling a tape drive system.

FIG. 2 is a flow diagram illustrating a process 200 for determining if an adjustment to one or more servo heads is required, according to an illustrative embodiment. Process 200 begins by obtaining two sets of y-position information "YPOS" from two y-position channels for servo heads 115 and 120. This is illustrated at step 210. Thus, in some embodiments, process 200 can be described as an obtaining or acquiring process. As discussed above, with respect to FIG. 1, the linear tape 116 has an x dimension and a y dimension. The ASIC circuit 160 reads this raw YPOS data along these two YPOS channels and identifies where the channel is relative to the corresponding servo head. For example, in one embodiment, a data track can have two sets of YPOS channel information, one represented on the top edge and one represented on the bottom edge of the data track, with the data track between the two YPOS signal channels. This allows the servo head to confirm that it is retrieving data from the data track instructed by the process. In other embodiments, the YPOS can be located on the edges of the linear tape 116, and the tracks can be incrementally separated so that the YPOS of each track can be inferred by the tape drive 100. In some embodiments, the width of the track or the track pitch on the linear tape 116 can be less than 50 µm, 10 µm, or 3.75 µm, however any width can be present.

The tape drive 100 positions the servo heads 115 and 120 in proximity to the tape medium such that the heads are close enough to pick up the YPOS signal from the passing linear tape 116 in addition to the data on the track. This YPOS information can be detected by servo heads 115 and 120. This YPOS information can be used to allow the process to verify the position of the respective servo head, and further, to verify that the correct data is being read, or that the correct data is being written to, the correct location. A sudden change or discrepancy in this YPOS information can be used to determine if the servo head 115 and/or 120 requires adjustment. When adjusting a servo head, due to the small track size, it is possible that an adjustment can be larger than the track width. Therefore a falsely detected spike could result in an adjustment that would place the servo head completely out of the track. For example, if a tape drive detects a spike that indicates an offset of 5 µm and the track width is 3.75 µm, it is possible that if a 5 µm adjustment is unnecessarily made, the servo head can end up completely off the track after the adjustment. Servo head adjustment may be affected by the physical adjustment properties of the head. In many ways the heads maximum adjustment capability is greater than the track width of the tape.

Once the YPOS information is obtained for the plurality of servo heads, the tape drive calculates a servo head offset to determine if the servo head offset has changed for the servo heads. This is illustrated at step 215. The servo head offset is the difference between the actual position of the servo head, and the position that the tape drive 100 has instructed the servo head controller 140 to position the servo head at, in relation to the passing linear tape. To determine if the servo head offset has changed, the process first calculates the position error signal (PES). The PES is a calculation depicting the difference between a current YPOS reference and the calculated offset. In one embodiment the PES is calculated by:

$$PES1 = YPOS1 - YPOSref - ch1ch2offset \qquad \text{Equation 1}$$

where PES1 is a first position error signal, YPOSref is the YPOS reference number, which is subtracted from a first YPOS (YPOS1), and from that difference, the difference between the two channel offsets is subtracted to give the channel 1/channel2 offset (ch1ch2offset). This is repeated for each PES calculation.

A PES is used as an input associated with the track following control. The PES signal is determined by subtracting a reference value from position information obtained from the YPOS information written in the linear tape 116 (as explained in greater detail above), and by subtracting from that difference, the ch1ch2offset value.

In one embodiment the channel offset is calculated by:

$$ch1ch2offset = \frac{\sum_{i=1}^{n}(YPOS1[i] - YPOS2[i])}{2n} \qquad \text{Equation 2}$$

where "n" is the number or quantity of counts in a threshold, where "i" is the current count, where "YPOS1[i]" is the first YPOS for the current count, and where "YPOS2[i]" is the second YPOS for the current count.

To determine the ch1ch2offset for a particular servo head, the YPOS for the first channel is subtracted from the YPOS of the second channel for a servo head. This difference is repeated for n counts. The sum of those differences between the YPOS for the two servo head channels is then divided by two times n, where n is the number of counts. The process repeats this procedure for both servo heads. The process then subtracts the two different servo head offsets from each other to get an offset difference calculation (OffsetDiffCal). In one embodiment the OffsetDiffCal is calculated by:

$$Ch1Ch2\text{offset}L - Ch1Ch2\text{offset}R = \text{OffsetDiffCal} \qquad \text{Equation 3}$$

where Ch1Ch2offsetL is the offset between the two channels of the first servo head and where Ch1Ch2offsetR is the offset between the two channels of the second servo head.

The following is an illustrative example embodiment according to Equation 2. In this example, servo head 115 is a left servo head and servo head 120 is a right servo head. It is understood, by one of skill in the art, that the servo head positions discussed are arbitrary, and that the left servo head could be servo head 120 and the right could be servo head 115. In this illustrative embodiment, the YPOS of the second channel (YPOS2) of the servo head 115 is subtracted from the YPOS of the first channel (YPOS1) of the servo head 115 to calculate a left servo head offset (Ch1Ch2offsetL). The YPOS of the second channel of the servo head 120 is then subtracted from the YPOS of the first channel of the servo head 120 to calculate a right servo head offset (Ch1Ch2offsetR). Ch1Ch2offsetL is then subtracted from Ch1Ch2offsetR and an offset difference between servo head 115 and servo head 120 is calculated. By subtracting the ch1ch2offset for the second servo head from the ch1ch2offset for the first servo head, the offset difference calculation (OffsetDiffCal) can be determined.

The linear tape 116 can experience a phenomenon of expansion and contraction which is called tape dimensional stability. Tape dimensional stability can be observed as a difference between the YPOS values of the servo head 115 and servo head 120. In order to remove the factor of tape dimensional stability, the PES builds in the correction of the tape dimensional stability based on the difference between the YPOS data retrieved from the two servo heads. The correction value corresponds to a value obtained by obtaining multiple samples of the difference of the YPOS values provided by the two servo channels on the linear tape 116 and dividing the average value thereof by two.

The offset difference can be calculated by subtracting the difference between the two sets of servo head channel offsets for the two servo heads 115 and 120. In some embodiments, if the OffsetDiffCal is substantially equal to a time zero factory calibration constant (OffsetDiffT0) which is determined during the manufacturing process, then no correction may be needed. However, if OffsetDiffCal is not substantially equal to OffsetDiffT0, then a changed servo head offset is confirmed. A change in the servo head offset can indicate that the position of the servo head has changed in relation to the target data track on the linear tape 116. In some embodiments a change in the servo head offset indicates that the linear tape 116 has changed its properties or track position relative to one or more servo heads.

A tape medium can exhibits expansion and contraction depending upon environmental conditions. These conditions can include temperature, humidity, etc. Values of the above offsets vary. In some embodiments, when the medium expands in the track direction, the offsets can take a positive value. When the medium contracts in the track direction, the offsets can take a negative value.) In some embodiments, mechanical conditions can result in a change in the properties of a tape medium, such as tension, slack, etc.

If a change in the servo head offset has occurred, the process can be configured so that a determination can be made whether a signal spike has been detected. This is illustrated at step 220. A signal spike is a change in the servo head offset that continues for a predetermined threshold. To determine that a signal spike has been detected, the ASIC circuit 160 takes multiple samples of the Ch1Ch2offset for each servo head 115 and 120 over a period to confirm that the change in the servo head offset is maintained for a specific duration threshold. The duration can be expressed in, for example, counts, cycles, time, or any other measurable unit. In some embodiments, when the duration is a unit of time, time can be measured in any useful unit such as seconds, milliseconds (ms), microseconds (µs), etc.

In some embodiments, a count can be an interval of time, a number of actions, a number of cycles, etc. In some embodiments where the count period is a duration of time, the duration of time can be any duration such as 1-1000 ms, 1-1000 µs, etc. In other embodiments, where a count is a number of cycles, the cycle can be any detected change such as a signal spike. For example, each time a signal spike is detected, a count is recorded. In other embodiments a counter may begin when a spike is detected, and for every time period after the spike remains detected the count is increased. For example, if a spike is measured a counter begins, for every specified count duration interval the count is increased. In some embodiments the count duration can be 10 µs, 20 µs, 30 µs, 40 µs, 50 µs or more.

In some embodiments, the process can be configured so that if the detected change in the servo head offset is maintained for at least a threshold, a signal spike is confirmed. In some embodiments, a number of counts can be used to indicate a threshold is reached. Any number of counts can be used to indicate a count threshold, such as 2, 4, 8, 16, etc., or any number that would allow a signal spike to be measured. If the offset is not maintained for the threshold duration, the process 200 returns to step 210, and repeats.

In one illustrative embodiment when a spike is measured, a counter and a timer begin at zero. When the timer reaches a preset count time duration, such as 50 µs, the count increases by one and the timer resets. This continues until the counter gets to a count threshold. If the count threshold is reached then the process continues. For example if the count threshold was set to 16 counts, when the signal spike continues for 16 counts, the process confirms that a signal spike is present, however if the signal spike does not continue for the number of counts required to meet the count threshold, then a signal spike is not measured.

If a signal spike was determined to be present, the tape drive 100 can make a control adjustment. This is illustrated at step 240. A control adjustment is a predetermined correction calculation that the process can perform to instruct the tape drive 100 how to reposition the servo heads 115 and 120 over the target data track in a corrected position on the linear tape 116. Thus, after the signal spike is confirmed and the current position of the servo heads is ascertained, the control adjustment can be calculated and executed to accomplish the corrected position for the servo heads.

In the track following operation during the locate operation of the tape drive, two state exists, i.e., "acquire" and "following." "Acquire" refers to a state that continues until control of the head with respect to the target position becomes stable. For example, FIG. 2. "Following" refers to a state that the control has become stable and write/read is possible. When the YPOS is determined to be stable then the tape drive makes this state transition and switches into the follow state from the acquire state. During the "following" state, a process can include a set of instructions to select the value closer to the OffsetDiffCal from Ch1Ch2offsetL and Ch1Ch2offsetR.

In some embodiments, when the tape drive 100 is in the acquire state, the tape drive will calculate OffsetDiffCal (equation 3). If the value of the difference between the OffsetDiffCal and OffsetDiffT0 is less than a threshold, then the tape drive with set OffsetRef to be equal to OffsetDiffCal. If the value of the difference between the OffsetDiffCal and OffsetDiffT0 is greater or equal to a threshold, the drive will post an error.

Figure 3:
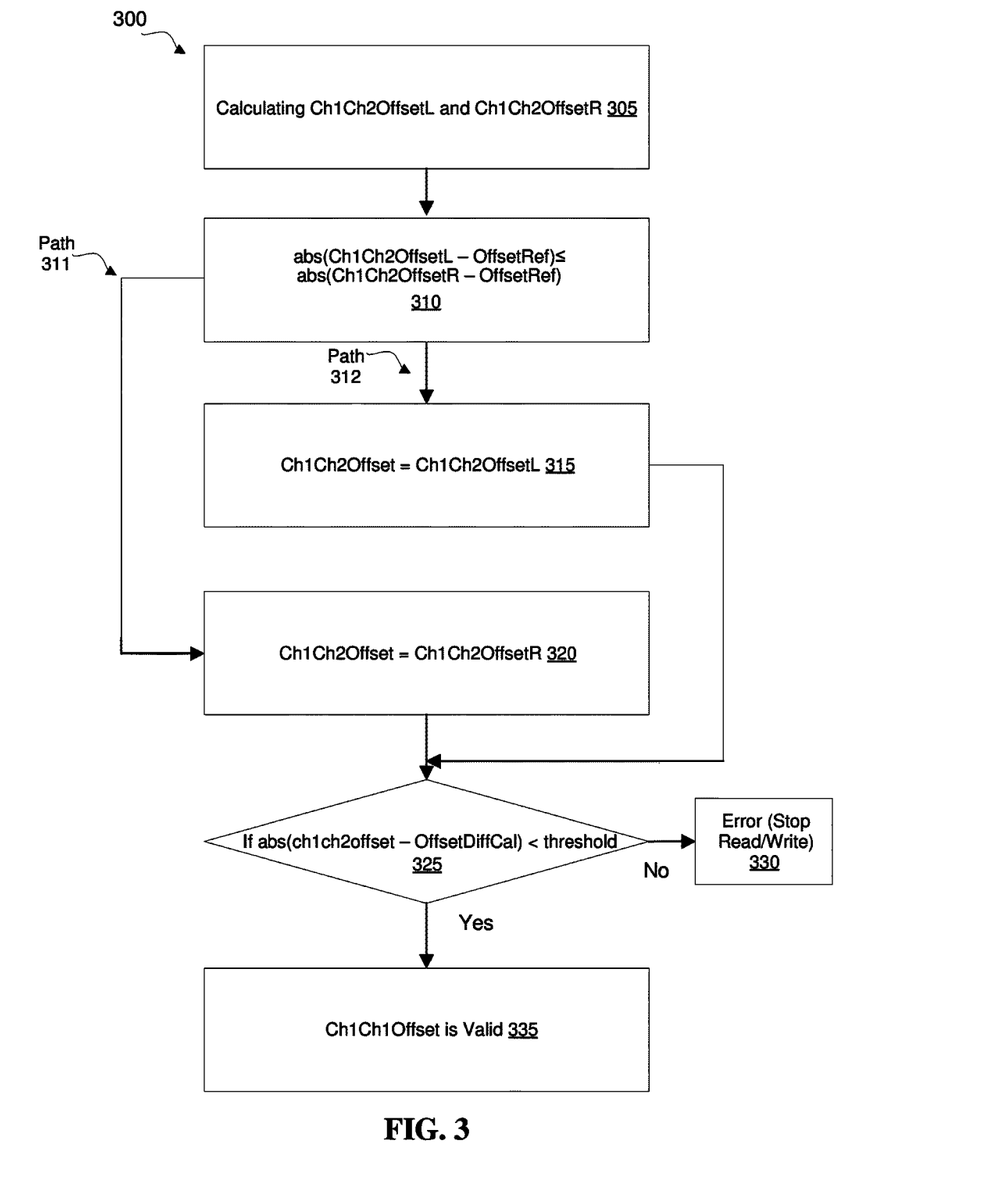
FIG. 3 is a block diagram illustration a process 300 for controlling a tape drive system.

FIG. 3 is a flow diagram illustrating a process 300 for determining if a YPOS continues to be stable for track following.

Process 300 begins by calculating the Ch1Ch2Offset for the left and right servo heads, Ch1Ch2OffsetL and Ch1Ch2OffsetR respectively. This is illustrated at step 305. At this step the process calculates the Ch1Ch2Offset for each servo head. For example, by using equation 2. In some embodiments, the calculation is made by using Y-POS data retrieved from the position sensor 130 and ASIC circuit 160. The YPOS data used to make these calculations is retrieved at step 210 in process 200.

The process 300 continues by determining if the value for Ch1Ch2OffsetL is closer to the OffsetRef. This is shown at step 310. If the value for the difference between Ch1Ch2OffsetL and OffsetRef is less than the value for the difference between Ch1Ch2OffsetR and OffsetRef then the process follows path 312.

If the process follows path 312, Ch1Ch2OffsetL is determined to be closer to the OffsetRef, and Ch1Ch2OffsetL is defined to be equal to the variable ch1ch2offset. This is shown at step 315.

When the value for Ch1Ch2OffsetR is determined to be closer to the OffsetRef, the process follows path 311. If the process follows path 311, Ch1Ch2OffsetR is defined to be equal to the variable ch1ch2offset. This is shown at step 320. Thus in some embodiments steps 310, 315, and 320 effectively chose the offset calculation from the servo head that has the lesser offset of the two servo heads. In other embodiments, the process can include instructions to define the channel offset from the servo head with the greater offset as the variable ch1ch2offset.

The process continues by determining if the difference of ch1ch2offset minus OffsetRef is less than a threshold. This is illustrated at step 325. If the difference is not less than the threshold, then an error state is determined and the process 300 includes instructions to end the process. An error state can occur if a read/write operation is terminated or determined to be invalid. This can occur when data is sent to be written or read at a tape drive servo head and confirmation that the data is written or retrieved from the tape medium is not able to be confirmed. An error state can also occur when a threshold is met by an offset. For example, when the difference between the ch1ch2offset and OffsetRef is not less than a threshold, the tape drive includes a set of instructions to define this threshold as an error state.

The tape drive can include a set of instructions to terminate read/write when an error state occurs. In other embodiments, the tape drive can include a set of instructions to terminate read/write when a threshold is met or not met. In some embodiments, this threshold can be met by a servo head offset comparison, for example, comparing the difference between the ch1ch2offset and OffsetRef and comparing that value with a threshold as explained above. This is illustrated at step 330.

When the difference is less than the threshold, the process determines the offset to be valid. This is illustrated at step 335. In some embodiments, at this step the process further includes a set of instructions to determine that a signal spike is detected or to perform a control adjustment as shown in process 200, steps 220 and 240.

Figure 4:
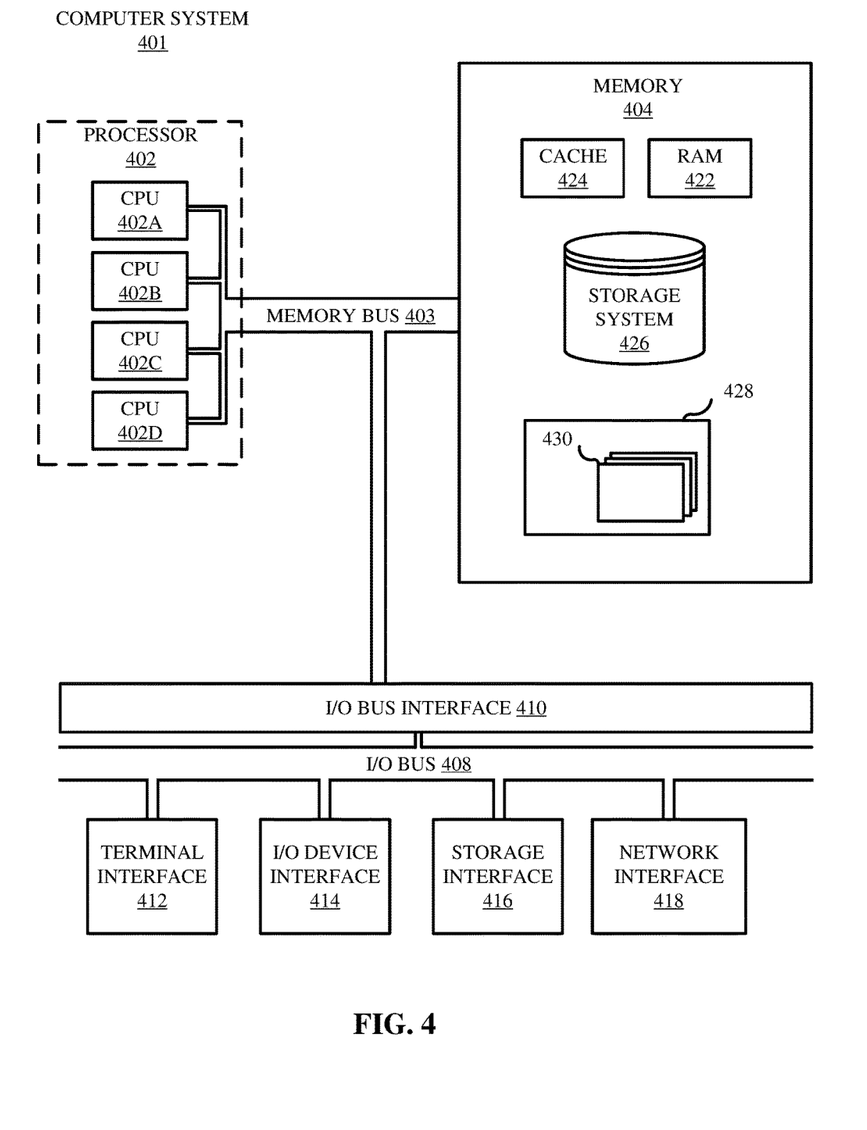
FIG. 4 is a block diagram illustration of a computer system, according to some embodiments.

Referring now to FIG. 4, shown is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive" or a magnetic tape drive. Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments. System memory 404 can include the tape drive 100 shown in FIG. 1.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

In some embodiments, the modules 430 may include instructions that perform the steps of the process, such as process 200 shown in FIG. 2, or the process 300 shown in FIG. 3.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method of reading a tape with a tape drive comprising:
    obtaining a first y-position and a second y-position for a first servo head;
    obtaining a third y-position and a fourth y-position for a second servo head;
    determining a change in the y-positions for the first servo head and for the second servo head by;
        determining that a y position signal spike is detected at one of the servo heads;
        in response to determining that a y-position signal spike is detected at one of the servo heads;
            determining a first servo head offset;
            determining a second servo head offset;
            calculating a difference between the first servo head offset and the second servo head offset;
            determining that the difference between the first servo head offset and the second servo head offset is not equal to an offset reference constant;

in response to determining that the difference between the first servo head offset and the second servo head offset is not equal to an offset reference constant, preforming a control adjustment for the first and second servo head offset.

2. The method of claim 1, wherein calculating further comprising:
obtaining a position error signal of a servo head; and
in response to obtaining the position error signal of the servo head, performing a control adjustment of the servo head position on the basis of the obtained position error signal.

3. The method of claim 1, wherein the y position is determined by an ASIC circuit.

4. The method of claim 1, wherein the determining that a y position signal spike is detected further comprises determining that the signal spike is maintained for at least 32 counts.

5. The method of claim 4, wherein when the signal spike is not maintained for at least 32 counts, the spike is determined to be a false spike.

6. The method of claim 1, wherein the first servo head offset is determined by calculating a difference between the first y-position and the second y-position of the first servo head.

7. The method of claim 1, wherein the second servo head offset is determined by calculating a difference between the third y-position and the fourth y-position of the second servo head.

8. The method of claim 1 further comprising:
comparing the value of the first servo head offset with the value of the second servo head offset to a reference servo head offset, and
selecting the servo head offset that is closest to the reference servo head offset as a representative servo head offset.

9. The method of claim 8, wherein the reference servo head offset is a factory calibration offset determined during the manufacturing process of the tape drive.

10. A computer program product comprising a computer readable storage medium having program instructions embodied therein, the program instructions executable by a first computing device to perform a method comprising:
obtaining a first y-position and a second y-position for a first servo head;
obtaining a third y-position and a fourth y-position for a second servo head;
determining a change in the y-positions for the first servo head and for the second servo head by;
determining that a y position signal spike is detected at one of the servo heads;
in response to determining that a y-position signal spike is detected at one of the servo heads;
determining a first servo head offset;
determining a second servo head offset;
calculating a difference between the first servo head offset and the second servo head offset;
determining that the difference between the first servo head offset and the second servo head offset is not equal to an offset reference constant;
in response to determining that the difference between the first servo head offset and the second servo head offset is not equal to an offset reference constant, preforming a control adjustment for the first and second servo head offset.

11. The computer program product of claim 10, wherein calculating further comprising:
obtaining a position error signal of a servo head; and
in response to obtaining the position error signal of the servo head, performing a control adjustment of the servo head position on the basis of the obtained position error signal.

12. The computer program product of claim 10, wherein the y position is determined by an ASIC circuit.

13. The computer program product of claim 10, wherein the determining that a y position signal spike is detected further comprises determining that the signal spike is maintained for at least 32 counts.

14. The computer program product of claim 10, wherein when the signal spike is not maintained for at least 32 counts, the spike is determined to be a false spike.

15. The computer program product of claim 10, wherein the first servo head offset is determined by calculating a difference between the first y-position and the second y-position of the first servo head.

16. The computer program product of claim 10, wherein the second servo head offset is determined by calculating a difference between the third y-position and the fourth y-position of the second servo head.

17. A tape drive system comprising:
at least one memory storing an offset reference constant;
a first servo head configured to read track position information from a magnetic tape;
a second servo head configured to read track position information from a magnetic tape;
at least one position sensor coupled to the first and second servo heads, configured to obtain a first, second, third, and fourth y-position information from the servo heads;
an application specific integrated circuit (ASIC) coupled to the at least one position sensor configured to:
determine a first servo head offset;
determine a second servo head offset;
calculate a difference between the first servo head offset and the second servo head offset;
determine that the difference between the first servo head offset and the second servo head offset is not equal to the offset reference constant;
generate a control adjustment for the first servo head or the second servo head.

18. The system of claim 17, wherein the ASIC is further configured to:
obtain a position error signal of a servo head;
perform a control adjustment of the first servo head and second servo head positions on the basis of the obtained position error signal.

19. The system of claim 17, wherein the ASIC is further configured so that when a difference between the first and second servo head offsets are not equal to the offset reference constant, the ASIC further determines that the offset difference is maintained for at least 32 counts.

20. The system of claim 17, wherein the ASIC is further configured to:
compare the value of the first servo head offset with the value of the second servo head offset to a reference servo head offset, and
select a servo head offset from the first and second servo head offset that is closest to the reference servo head offset as a representative servo head offset.

* * * * *